United States Patent
DeMaio

(10) Patent No.: US 11,240,583 B1
(45) Date of Patent: Feb. 1, 2022

(54) INTERCHANGEABLE AND RECHARGEABLE BATTERIES FOR EARBUDS

(71) Applicant: Robert Charles DeMaio, Incline Village, NV (US)

(72) Inventor: Robert Charles DeMaio, Incline Village, NV (US)

( * ) Notice: Subject to any disclaimer, the term of this patent is extended or adjusted under 35 U.S.C. 154(b) by 0 days.

(21) Appl. No.: 17/305,474

(22) Filed: Jul. 8, 2021

Related U.S. Application Data

(63) Continuation-in-part of application No. 29/788,633, filed on Jul. 6, 2021, and a continuation-in-part of application No. 29/788,627, filed on Jul. 6, 2021, and a continuation-in-part of application No. 29/788,631, filed on Jul. 6, 2021.

(51) Int. Cl.
| | |
|---|---|
| *H02J 7/00* | (2006.01) |
| *H04R 1/10* | (2006.01) |
| *H01M 50/269* | (2021.01) |
| *H01M 50/247* | (2021.01) |
| *H04R 25/00* | (2006.01) |

(52) U.S. Cl.
CPC ........ *H04R 1/1025* (2013.01); *H01M 50/247* (2021.01); *H01M 50/269* (2021.01); *H01M 2220/30* (2013.01); *H04R 25/602* (2013.01); *H04R 2225/31* (2013.01)

(58) Field of Classification Search
CPC ............... H04R 1/1025; H04R 25/602; H04R 2225/31; H01M 50/247; H01M 50/269; H01M 2220/30
USPC .......................... 320/112, 114; 381/69.2, 150
See application file for complete search history.

(56) References Cited

U.S. PATENT DOCUMENTS

| | | | |
|---|---|---|---|
| 2006/0039574 A1* | 2/2006 | Chen | H04R 1/1058 381/151 |
| 2012/0274279 A1* | 11/2012 | Banos | H02J 7/0016 320/112 |
| 2013/0243229 A1* | 9/2013 | Shennib | H04R 25/602 381/323 |
| 2019/0028821 A1* | 1/2019 | Stallard | H04R 25/65 |

* cited by examiner

*Primary Examiner* — Zixuan Zhou
(74) *Attorney, Agent, or Firm* — Tatonetti IP

(57) ABSTRACT

A pair of earbuds having interchangeable and rechargeable batteries is implemented, enabling the user to switch out a depleted battery with a charged one and virtually endlessly listen to music, video, etc. A rear of the earbud's main body is adapted with charging/connecting points to which corresponding connecting points on a detachable battery are positioned. The contact points are positive and negatively charged so that a current from the battery can pass to the main body for use. In addition, the battery is external to the earbud's main body so that the user can easily detach and replace it with a new one within seconds. Furthermore, a rear side of the battery is adapted with a touch-input surface that receives input from a user to control the earbuds and connected computing device's functions, such as play and pause, adjust the volume, and answer phone calls.

18 Claims, 10 Drawing Sheets

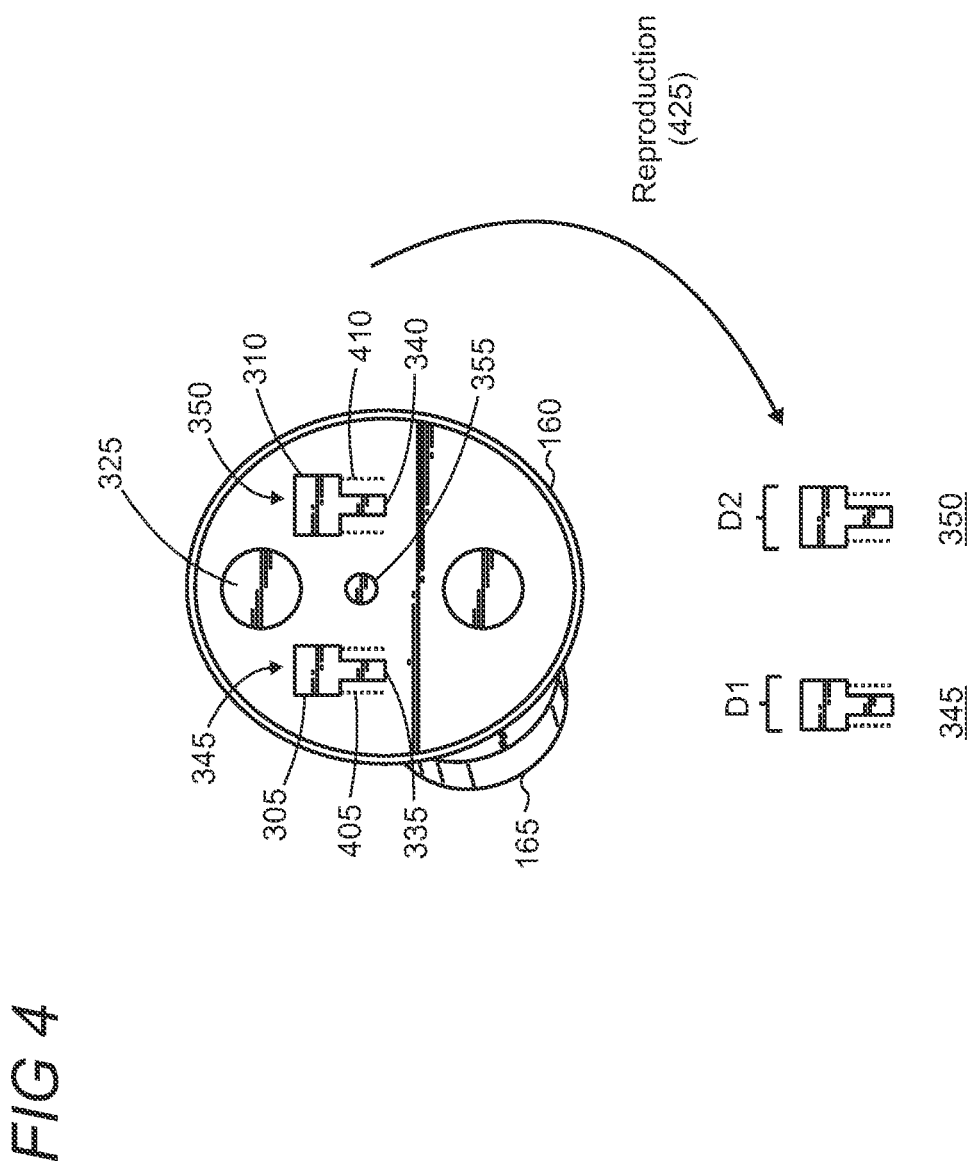

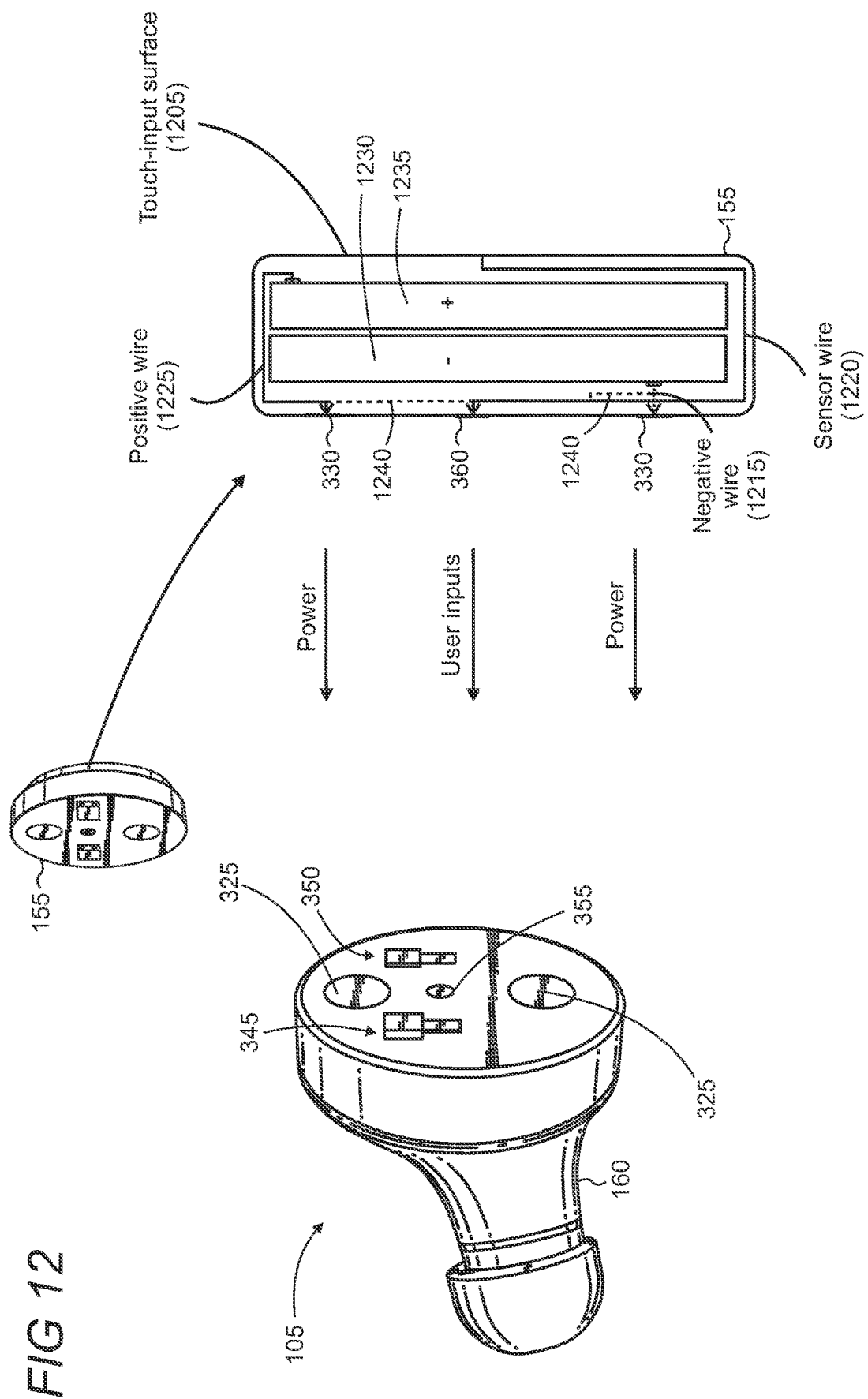

1400

US 11,240,583 B1

INTERCHANGEABLE AND RECHARGEABLE BATTERIES FOR EARBUDS

CROSS-REFERENCE TO RELATED APPLICATIONS

This Non-Provisional Utility Patent Application is a Continuation-In-Part (CIP) Application that claims the benefit of and priority to U.S. Non-Provisional Design Patent Application Serial No. 29/788,627, entitled "Earbud with Detachable and Reusable Battery," Design Patent Application Serial No. 29/788,631, entitled "Detachable and Reusable Battery for Earbud," and Design Patent Application Serial No. 29/788,633, entitled "Earbud without Detachable and Reusable Battery," each filed Jul. 6, 2021, the entire contents of each application of which is hereby incorporated herein by reference.

BACKGROUND

Earbuds and headphones are often limited by their battery's charging state. As a result, users are forced to remove their rechargeable and wireless earbuds and attach them to a power source, such as a USB (universal serial bus) port or their charging case. Unfortunately, such limitations force the user to switch to a new pair of headphones or temporarily stop listening to music altogether.

SUMMARY

A pair of earbuds having interchangeable and rechargeable batteries is implemented, enabling the user to switch out a depleted battery with a charged one and virtually endlessly listen to music, video, etc. A rear of the earbud's main body is adapted with charging/contact points to which corresponding contact points on a detachable battery are positioned. The contact points are positively and negatively charged so that a current from the battery can pass to the main body for use. In addition, the battery is external to the earbud's main body so that the user can easily detach and replace it with a new one within seconds.

The earbud's main body includes receptacles to securely attach to and detach from the battery's male members. The contact points become aligned when the battery is fully engaged and secured to the main body's receptacles. The main body has two differently sized receptacles, and the battery has two differently sized male members. Each male member corresponds in size and shape to one receptacle to ensure that the user attaches the battery in the correct orientation. This can also prevent short-circuiting through incorrect positive and negative contact points alignment.

The main body and the battery each have a sensor that engages with each other when the battery is connected. The sensor passes information from the battery to the main body so the earbud can detect characteristics about the battery, such as that a battery has been connected, the battery's current charge status (e.g., 20%), etc. Using the sensor, for example, the earbud may output an auditory alert to the user that the battery is low when it hits a threshold charge (e.g., ten percent).

Additionally, the battery can be configured with an input-touch sensor, such as a capacitive sensor, that detects user input against a rear side of the battery. The battery passes detected input to the sensor or metallic contact point that transfers the input to the earbud's main body for processing. In this regard, the main body may be configured with a memory device and processor which performs an operation responsively to receiving the user input. For example, the user input at the touch input sensor can trigger play, pause, or stop functions, adjusting the volume up or down, fast-forwarding and rewinding, and answering a phone call or some other action. Such actions may be transmitted from the earbud's Bluetooth® or other radio transceiver to the user's computing device for adjusting such functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 4 shows an illustrative representation of the connection point for the earbud;

FIG. 12 shows an illustrative representation of the battery's interior components and configuration;

Like reference numerals indicate like elements in the drawings. Elements are not drawn to scale unless otherwise indicated.

DETAILED DESCRIPTION

Figure 1:
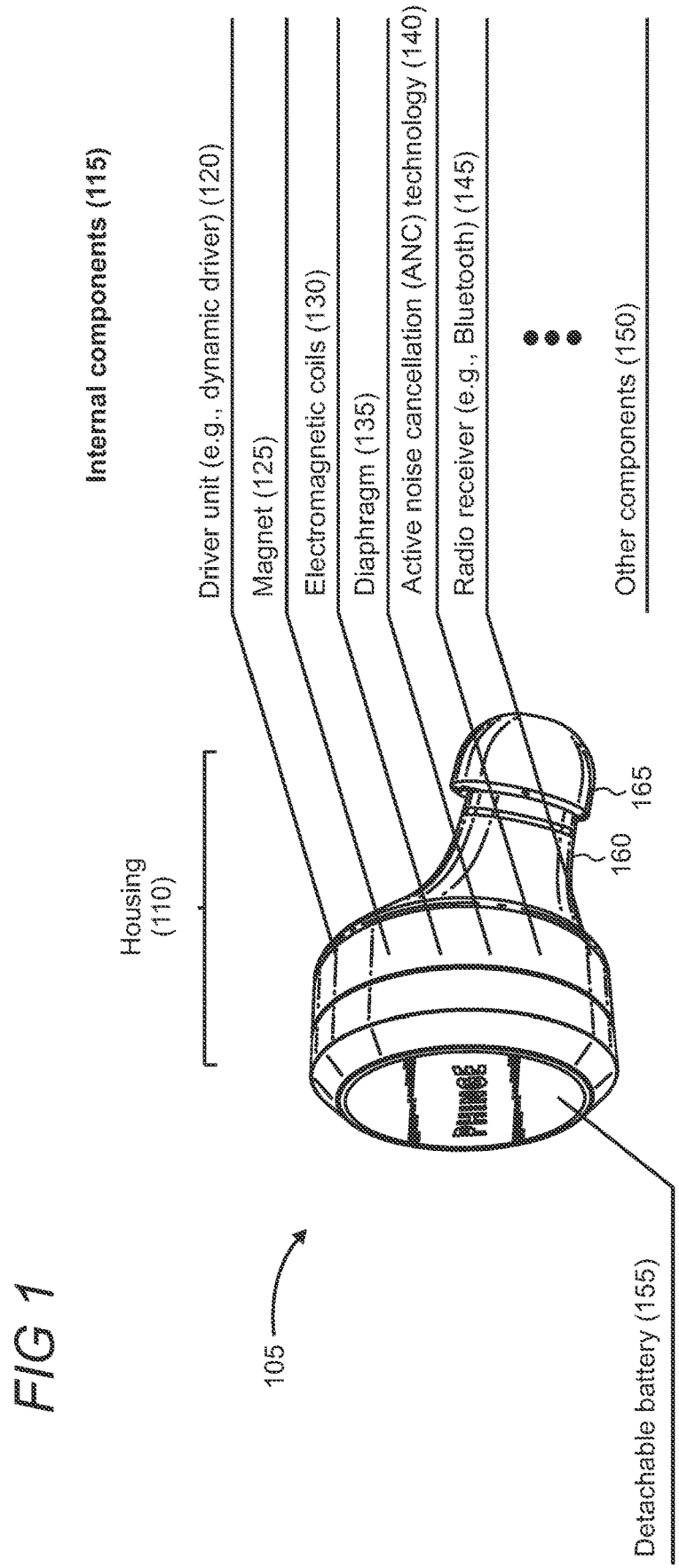
FIG. 1 shows an illustrative representation of an earbud with a detachable battery.

FIG. 1 shows an illustrative representation of an earbud 105, which has a main body 160, a silicone ear tip 165 that is inserted into a user's ear, and a detachable battery 155. The battery may be a rechargeable lithium-ion (Li-ion) battery that can receive a charge for re-use. The battery may have a universal serial bus (USB) port (e.g., micro USB, macro USB, etc.), or a proprietary charging case may be utilized to receive a charge. While a single earbud is shown in the drawings, a second earbud that fits inside a user's other ear may be configured similarly so a user can use two earbuds simultaneously, as commonly done. The earbud has a housing 110 that protects its internal components 115, which operate the earbud, namely, play sound. The housing may be comprised of plastic, metal, or some other suitable polymer.

The earbud may receive analog signals that have been converted using a digital-to-analog converter (DAC) either at the computer sending the signals or the earbud. The analog signals are processed at a driver unit 120, including a dynamic driver, planer magnetic driver, or an electrostatic driver. In addition, the driver unit may include a permanent magnet 125, electromagnetic coils 130, and a diaphragm 135 used to translate the signals into sound.

In a dynamic driver 120, electromagnetic coils 130 may switch the signal's polarity back and forth depending on its pattern (or reproducible sound), and the switched signals may engage with the permanent magnet for vibration. The signals are received by the diaphragm 135, a thin membrane, which causes the air to vibrate and which users perceive as sound. Other driver units operate differently, but such driver units may also be utilized in the present disclosure. The type of driver unit and sound-producing earbuds do not affect the present disclosure.

The earbud's internal components 115 may likewise be configured with active noise cancellation (ANC) technology 140, preventing ambient noises from distracting the user during earbud use. The earbud may include a radio receiver (e.g., Bluetooth®) 145 to wirelessly receive the digital or analog signals from a computing device, such as a smartphone, tablet computer, personal computer, laptop computer, etc. The earbud may include other components 150 not mentioned, but as would typically be understood for earbuds for operating.

Figure 2:
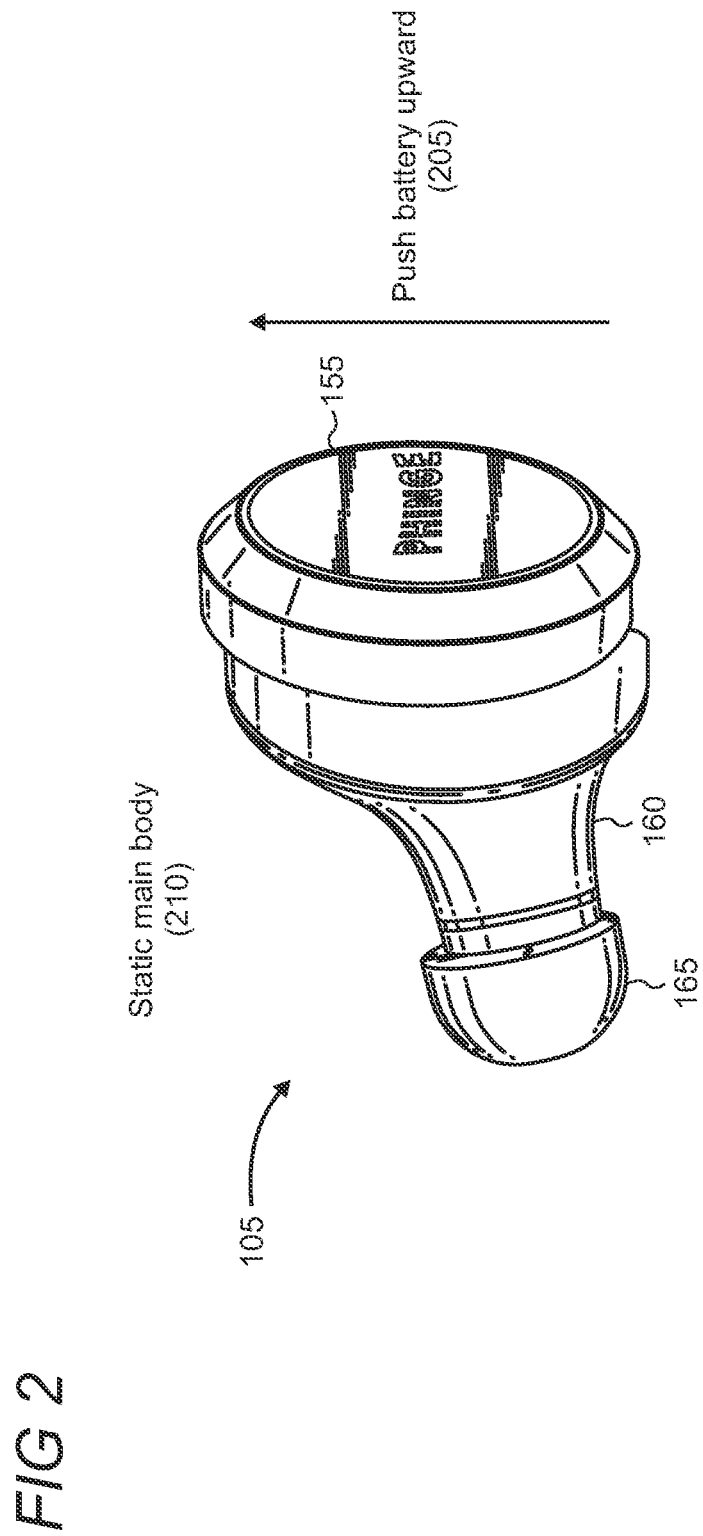
FIG. 2 shows an illustrative representation of the detachable battery being detached from the earbud's receptacle.

FIG. 2 shows an illustrative representation in which the detachable battery 155 is pushed vertically upward relative to the static main body 160, as representatively shown by numerals 205 and 210. The user may hold the earbud's main body while exerting some upward pressure. The user can tell which direction to push the earbud relative to the main body by, for example, referring to the upright positioning of the Phinge™ logo. In other embodiments, an arrow may be printed on the battery 155 or a circumferential side of the main body 160, indicating which way to push the battery.

Figure 3:
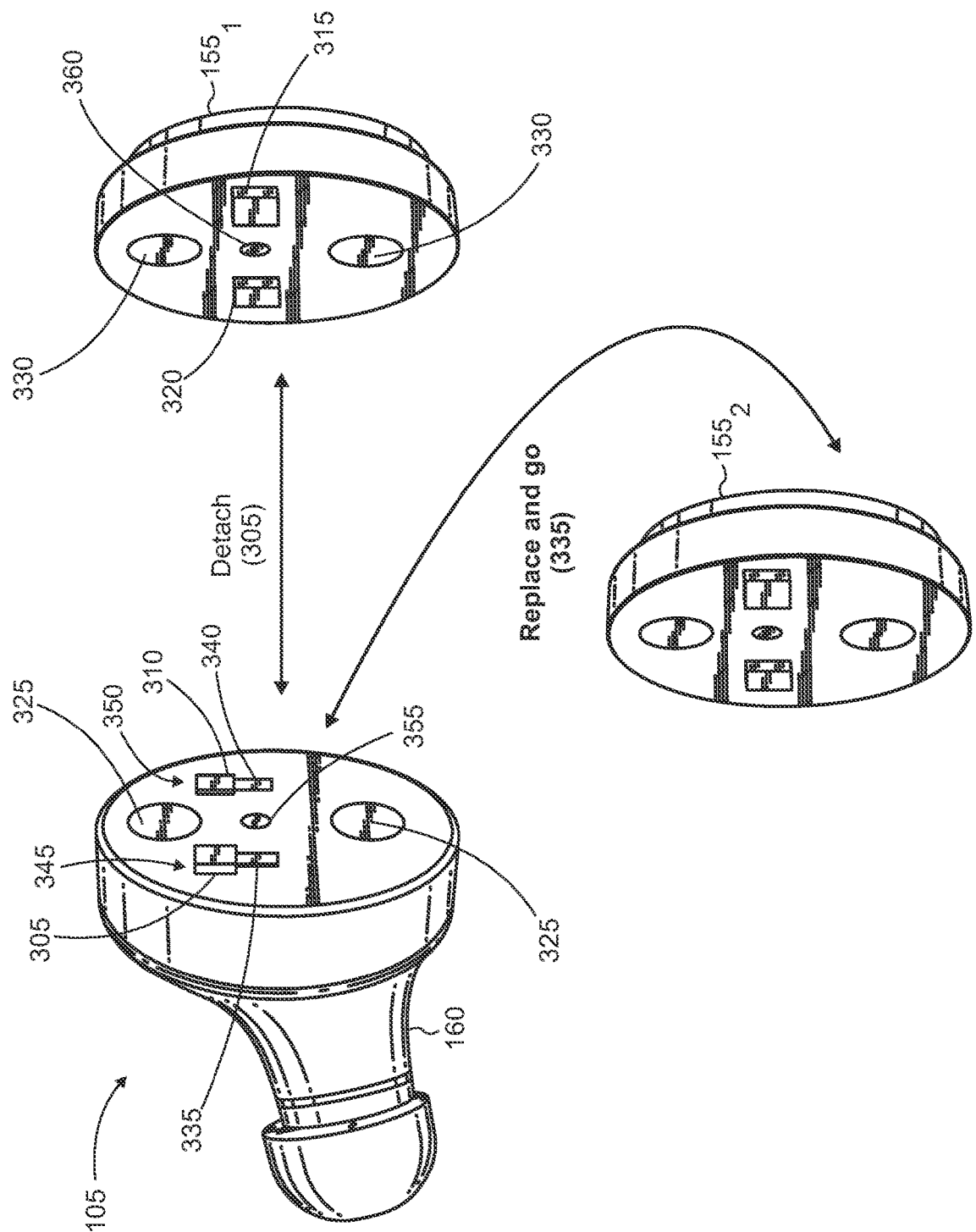
FIG. 3 shows an illustrative representation of the detachable battery being removed and replaced with a new detachable battery.

FIG. 3 shows an illustrative representation in which the detachable battery 155 (FIGS. 1 and 2) is completely detached from the earbud's receptacle and rear connecting surface, as representatively illustrated by numeral 305. The detachable battery is configured with protruding male members 315, 320 which insert into receptacles 345, 350, respectively. The male members respectively engage with the corresponding openings 305, 310 at the receptacles' upper end and lock into place when pushed downward. The openings correspond in size and shape to the opposing male members on the battery. The bottom portions of the receptacles are channels 335, 340 that are relatively thinner than their upper openings to prevent the earbuds from being detached. When pushed downward, the male members may lock into place via some fastening mechanism inside the receptacles, such as a tab and notch, friction fit, magnetic attraction, or a combination thereof.

FIG. 4 shows an illustrative representation in which each receptacle may include a smaller friction channel 405, 410 therein to provide a friction fit for the male battery's members 315, 320 (FIG. 3). The friction channels are inside the receptacle and behind the exterior channel, as illustrated by the use of broken lines. The friction channels may be slightly smaller than the receptacles and male members to create the friction. Thus, the male members are engaged with a friction-fitted insert to secure and hold the battery in place during use. The friction fit may be configured such that the battery can still be removed with some user exertion (FIG. 2).

Each receptacle and channel may be differently sized so that the user puts the battery in the correct orientation (e.g., not upside down). FIG. 4, for example, shows that receptacle 345 has a size D1 that is smaller than the size of D2 of receptacle 350, as shown in reproduction 425. As a result, if the user accidentally attempts to fit the battery's male members into the openings 305, 310 upside down, then the user will quickly realize that the battery is incorrectly oriented since the male members will not correctly fit.

While differently sized receptacles and male members are shown in the drawings, other methods of encouraging a proper connection are also possible, such as using differently shaped components (e.g., circles, triangles, squares) or placing the connecting components at different spots so that only one way of connection is possible. For example, the receptacles may be diagonal to each other, and the male members may be diagonal to each other, thereby creating a single battery orientation method for insertion.

Furthermore, while two receptacles and male members are discussed herein, in some embodiments, a single receptacle and male member implementation may be utilized. Alternatively, more than two receptacles and male members may be utilized (such as connection mechanisms with a smaller form factor).

Referring back to FIG. 3, the user can replace the detached battery 155 with a new, fully charged battery 155 and continue using the earbuds, as representatively shown by numeral 335. The batteries are differentiated using subscripts 1 and 2, and additional batteries may be used in the current system; the user is free to replace depleted batteries with charged ones. Upon connecting a new battery, the user is free to continue using the earbuds for the length of a fully charged battery. In the meantime, the user can start charging the depleted battery.

The rear of the earbud's main body 160 includes negative and positive contact points 325 for receiving the charge from corresponding negative and positive contact points 330 on the detachable battery 155. The contact points on each component engage with each other when the battery's male members 315, 320 are secured to the earbud's receptacles 345, 350. Specifically, the contact points fully align or overlap after the battery is pushed, fastened, and secured into the receptacles' channels 335, 340 and fastening mechanism. The contact points may be off-centered before the battery is fastened to the receptacle, such as when male members are initially inserted in the openings. The contact points may be comprised of a metal material, such as brass, aluminum, gold, etc. Implementing the differently sized receptacles helps prevent any short-circuiting of the battery or earbuds by preventing the user from reversing the positive-negative contact points.

The battery 155 and the rear surface of the main body 160 also include sensors 355, 360, respectively, that are used to detect the battery's attachment to the earbud and other sensory information, and transfer sensory data from the battery to the main body 160. For example, the sensor can detect the battery's remaining charge. As a result, the earbud can trigger an auditory alert to the user when the battery reaches a minimum threshold charge, such as 20% battery remaining. In addition, as discussed in greater detail below with respect to FIGS. 9-13, the battery sensor 360 can also serve as a transmission point (e.g., comprised of brass, gold, copper, etc.) through which detected sensory data at the battery is transmitted to the main body for processing. Thus, the sensors 355, 360 may be used to generate data and transmit information, such as user inputs, at the battery.

Figure 7:
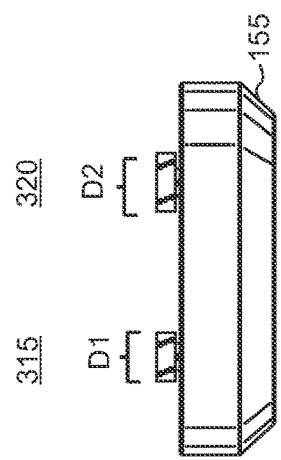
FIGS. 5-7 show illustrative representations of the detachable battery.
Figure 6:
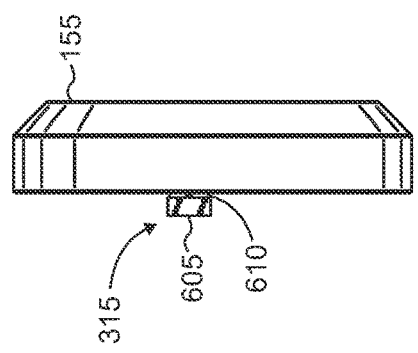
Figure 5:
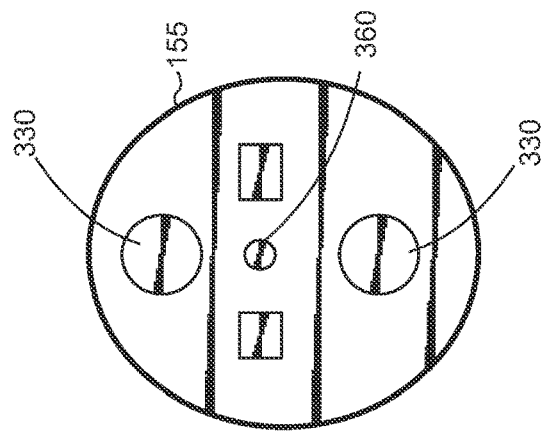

FIGS. 5-7 show illustrative representations of the detachable battery 155 from various angles. FIGS. 5 (front view) and 7 (top view), for example, show the male members 315, 320 likewise having a size of D1 and D2, respectively, which accordingly can fit inside the main body's receptacles 345, 350 (FIG. 4). While the male members may protrude outward from the battery, the charging contact points and sensors may be substantially flush with the battery's surface.

As shown in FIG. 6, the male member 315 includes a head 605 and neck 610 to which the head is attached. The head fits inside the main body's receptacle, and the smaller neck advances through the receptacle's channel. Thus, when inserted, the head prevents the male member from being removed from the receptacle. The shape and size of the neck may correspond to the shape and size of the channel. Each male member 315, 320 includes a similar arrangement with a head and neck, as shown in FIG. 7, but may be differently sized, as discussed above, to encourage correct orientation of the battery.

Figure 8:
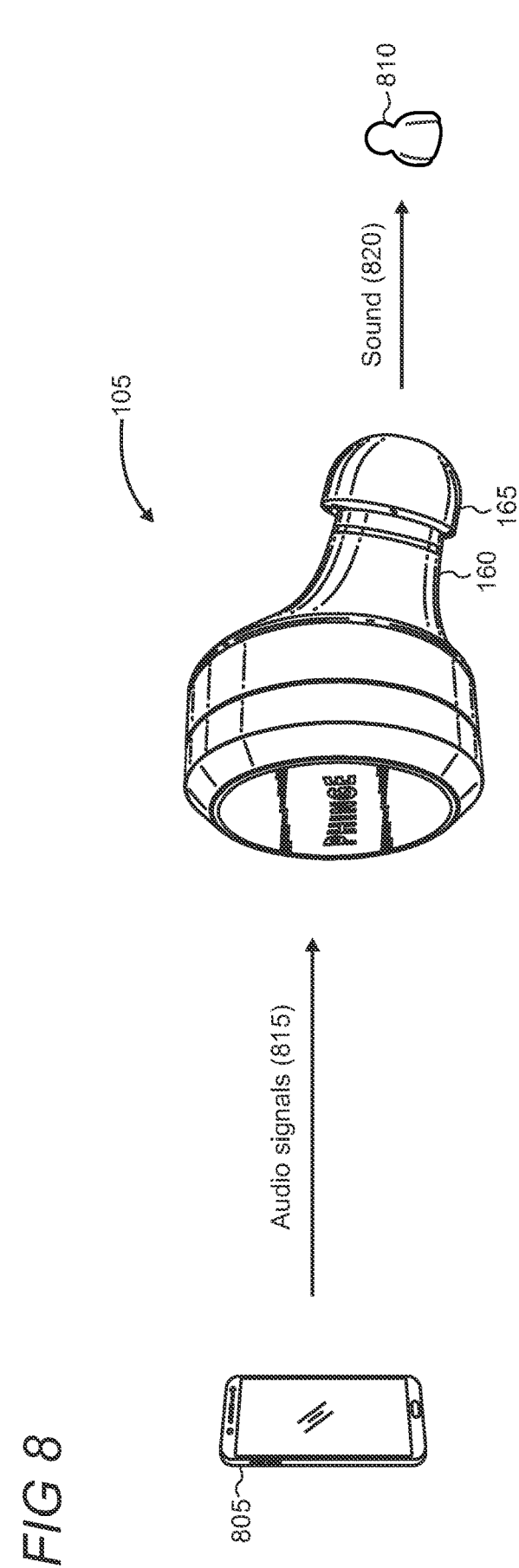
FIG. 8 shows an illustrative representation of the earbud with a detachable battery used with a smartphone computing device.

FIG. 8 shows an illustrative use implementation in which the earbud 105 receives audio signals 815 from a smartphone computing device 805. One or both of the smartphone or earbuds may be adapted with a DAC that converts the digital signals into analog signals for translation into sound by the earbud (FIG. 1). Upon receiving and processing the signals, the earbud outputs sound 820 to the user 810.

In the present implementation, the user may continue using the earbuds until the battery's charge is depleted. Upon depletion or receiving a warning that the battery will be depleted soon, the user can detach the old battery, attach a new battery in its place, and then continue listening to music or other media. This implementation of detachable and interchangeable batteries can enable a user to listen to music virtually non-stop. Furthermore, the user is no longer limited to the lifespan of an internal and permanent battery of the earbud; but instead, the user can remove and replace the external battery in a matter of seconds.

Using a charging case (not shown), user 810 can recharge the batteries 155. For example, the charging case may have contact points corresponding to the battery's contact points 330 (FIGS. 3 and 5). Alternatively, in some embodiments, the battery may be configured with a USB port (e.g., micro USB, macro USB, etc.) (not shown) that the user can use to charge using a USB cable.

Figure 9:
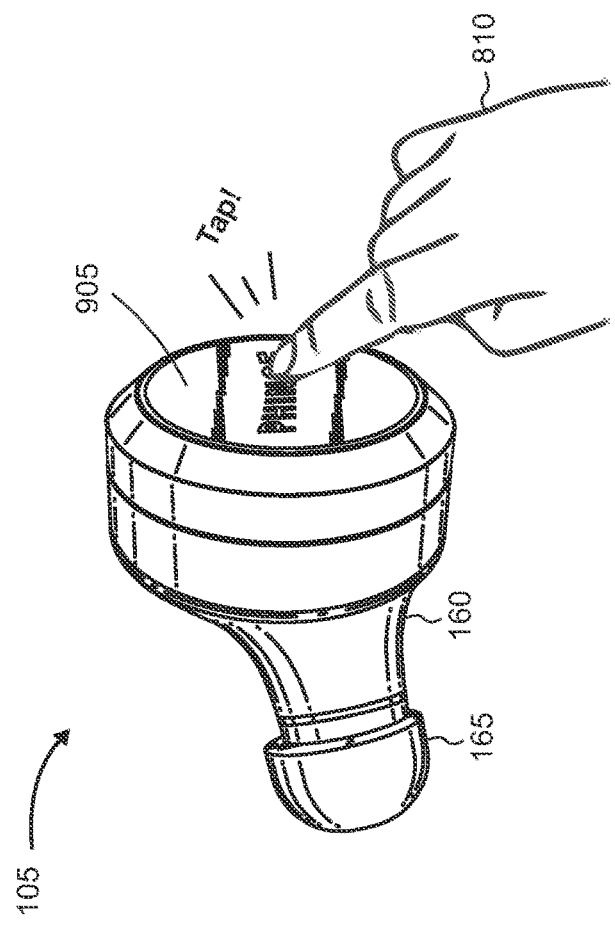
FIG. 9 shows an illustrative representation of a user tapping an input sensory surface on the detachable battery.

FIG. 9 shows an illustrative representation in which a user taps on the rear side 905 of the detachable battery 155 to control the earbuds or a computing device sending audio signals to the earbuds (FIG. 8). The rear side of the battery may be configured with one or more touch input sensors that function similarly as a touch screen on a user's computing device, like a smartphone or tablet computer. For example, the rear side of the battery may be configured with a capacitive touch sensor that detects electrical disturbance at a given location, a resistive sensor that detects pressure, or infrared sensors that detects the beams breaking or changing.

Figure 10:
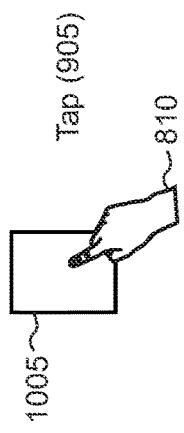
FIGS. 10 and 11 show exemplary representations of acceptable user inputs at the input sensor.
Figure 11:
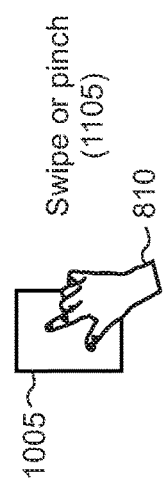

FIGS. 10 and 11 show illustrative forms of user inputs that the touch input sensors may detect. Acceptable user inputs that the touch input sensors may detect include tapping 905 or swipes or pinches 1105. The input device 1005 represents the touch surface on the rear of the battery.

FIG. 12 shows an illustrative representation in which internal components of the battery 155 are utilized to transfer power and user inputs to the main body 160 of the earbud 105. The battery includes a positive terminal (cathode) 1235 and a negative terminal (anode) 1230 to enable the flow of electric current. Each terminal has a connector from which a positive wire 1225 and negative wire 1215 extend. The wires connect to the respective contact points 330, which are either positively or negatively charged. For example, in FIG. 12, the upper contact point is positively charged, and the lower contact point is negatively charged. As discussed above, implementing one or more of differently sized or shaped receptacles and male members ensures that the correct contact point connects to the main body's corresponding charge (i.e., positive or negative).

The touch-input surface 1205 on the rear surface 905 (FIG. 9) of the battery includes a sensor wire 1220 to transmit signals from detected input to the sensor 360. The sensor 360 can be used to transmit detected information about the battery to the earbud's main body 160 and can also be used to relay information detected from other sensory devices, such as the touch-input surface 1205. The sensor 360 may be connected to the positive and negative charges, as shown by wire 1240, to detect a remaining battery life.

Furthermore, the sensor 360 can also serve as a conduit, comprised of some metal such as gold or brass, through which detected user inputs at the touch-input surface are relayed to the main body for processing. The earbud may have a processor, such as a microcontroller configured to perform discrete operations and memory storing executable instructions. The processor and memory work together responsive to receiving the sensory data at sensor 355 from the battery's sensor 360.

While FIGS. 9 and 12 show a touch-input surface 1205 as the input method for the earbud, other input mechanisms are also possible. For example, the rear side of the earbud may have one or more mechanical buttons that control the functions, such as a play/pause button, volume adjustment button, and fast forward and rewind buttons. Inputs at the physical buttons can be transmitted to the earbud via the sensor wire 1220.

The central processing components (e.g., processor, memory, Bluetooth®) for the earbud may be inside the main body 160. Thus, any detected inputs are transmitted from the battery's sensor to the main body for processing.

Figure 13:
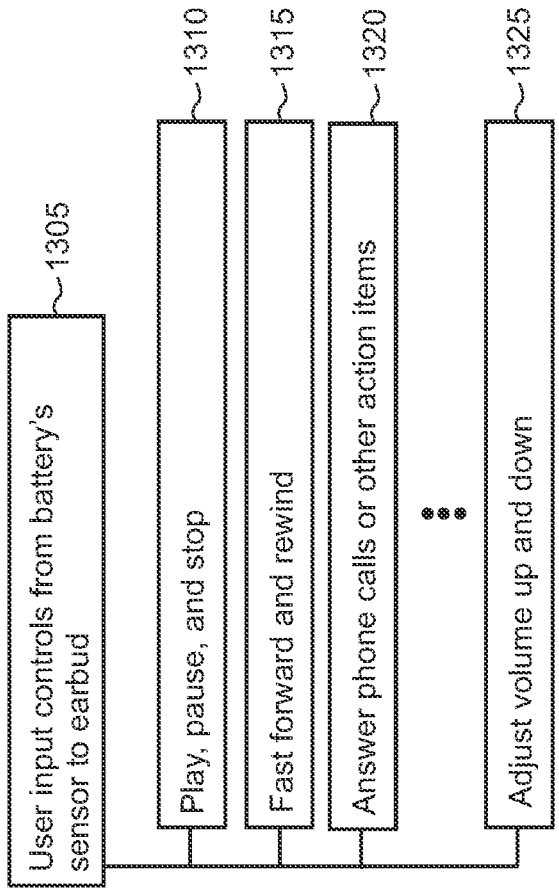
FIG. 13 shows an illustrative schema of input controls acceptable at the battery's input sensor.

FIG. 13 shows an illustrative schema of control operations that the earbud may perform responsive to receiving user input at the battery's touch input surface (FIG. 12). For example, various types of user inputs can cause the earbud to play, pause, and stop 1310, fast forward and rewind 1315, answer phone calls or other action items 1320, and adjust volume up and down 1325, among other operations. Since two earbuds will typically be used together, the earbud 105 may process the received input and transmit a signal, either wirelessly or through a wire, to the other earbud. Thus, the user's input at one earbud translates to the same operation being performed by the earbud's pair.

Various input combinations at the touch-screen surface 1205 can result in the control functions shown in FIG. 13. For example, a forward, backward, upward, or downward swipe can result in fast-forwarding, rewinding, or volume adjustments. Single or multiple taps at the touch surface can result in particular control functions, such as a single tap representing a play and pause function and a double-tap resulting in an action item, such as answering a phone call or clicking a button on the user's computing device. Since these functions control the computing device that transmits the audio or media signals, the earbud may utilize a two-way Bluetooth® radio, or transceiver, to transmit such controls from the earbud to the computing device. The earbud thereby functions as an input as well as output periphery device to the user's computer.

While discussions of detachable batteries for a pair of earbuds are disclosed herein, similar features can be leveraged for other computing or peripheral devices. For example, larger-sized headphones (as opposed to earbuds) may utilize the current system. Smartphone or tablet computing devices may be configured with a section, such as a section of its rear surface opposite the display screen, that can be detached from the device's external housing and easily replaced with a new, fully charged battery. Other peripheral devices that can utilize this system include a wireless mouse (i.e., pointing device) that typically relies on batteries, webcams, remote controls, etc. A section of each device, typically on its rear or bottom surface that is unused, may store a detachable battery that can be removed and replaced as discussed herein.

Figure 14:
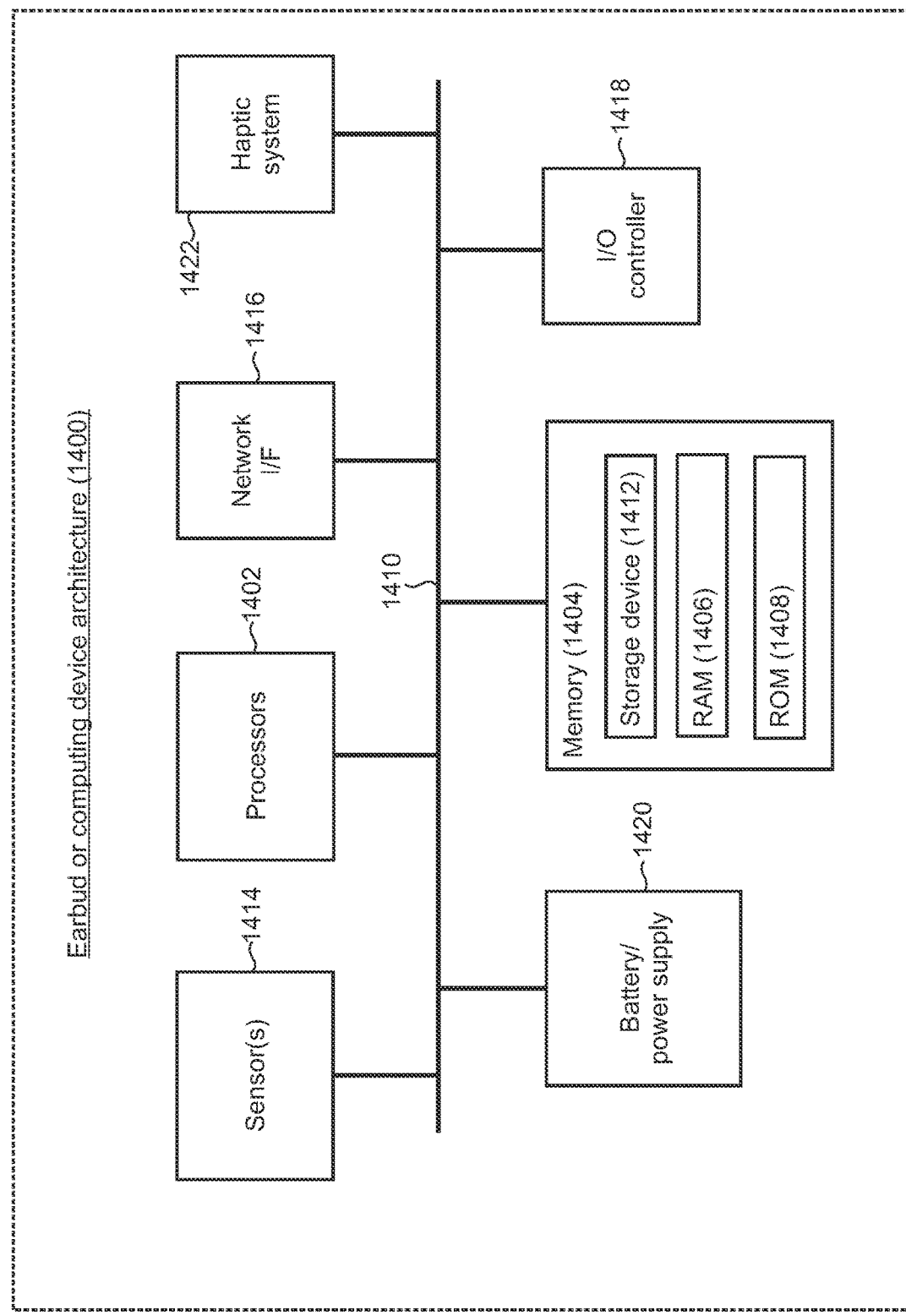
FIG. 14 shows an illustrative block diagram of components that may be implemented by a computing device, such as the earbuds, in order to perform some of the functions discussed herein, a smartphone, tablet, laptop, or personal computer.

FIG. 14 shows an illustrative architecture 1400 for a device, such as a pair of earbuds, smartphone, tablet, laptop, or personal computer capable of executing the various functions described herein. In this regard, the diagram illustrates components utilized by a computer, such as a smartphone, which transfers audio or other media to the earbuds, and the earbuds may utilize a similar configuration to process the received signals.

The architecture 1400 illustrated in FIG. 14 includes one or more processors 1402 (e.g., central processing unit, dedicated AI chip, microcontroller, graphics processing unit, etc.), a system memory 1404, including RAM (random access memory) 1406, ROM (read-only memory) 1408, and long-term storage devices 1412. The system bus 1410 operatively and functionally couples the components in the architecture 1400. A basic input/output system containing the basic routines that help to transfer information between elements within the architecture 1400, such as during startup, is typically stored in the ROM 1408. The architecture 1400 further includes a long-term storage device 1412 for storing software code or other computer-executed code that is utilized to implement applications, the file system, and the operating system. The storage device 1412 is connected to processor 1402 through a storage controller (not shown) connected to bus 1410. The storage device 1412 and its associated computer-readable storage media provide non-volatile storage for the architecture 1400. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1400, including solid-state drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), EEPROM (electrically erasable programmable read-only memory), Flash memory or other solid-state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1400.

According to various embodiments, the architecture 1400 may operate in a networked environment using logical connections to remote computers through a network. The architecture 1400 may connect to the network through a network interface unit 1416 connected to the bus 1410. It may be appreciated that the network interface unit 1416 also may be utilized to connect to other types of networks and remote computer systems. The architecture 1400 also may include an input/output controller 1418 for receiving and processing input from a number of other devices, including a keyboard, mouse, touchpad, touch-screen, control devices such as buttons and switches or electronic stylus (not shown in FIG. 14). Similarly, the input/output controller 1418 may provide output to a display screen, user interface, a printer, or other type of output device (also not shown in FIG. 14).

It may be appreciated that any software components described herein may, when loaded into the processor 1402 and executed, transform the processor 1402 and the overall architecture 1400 from a general-purpose computing system into a special-purpose computing system customized to facilitate the functionality presented herein. The processor 1402 may be constructed from any number of transistors or other discrete circuit elements, which may individually or collectively assume any number of states. More specifically, processor 1402 may operate as a finite-state machine in response to executable instructions contained within the software modules disclosed herein. These computer-executable instructions may transform the processor 1402 by specifying how the processor 1402 transitions between states, thereby transforming the transistors or other discrete hardware elements constituting the processor 1402.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An earbud that outputs auditory sounds, comprising:
a main body having internal components for translating audio signals into sound, the main body having:
a first receptacle having an upper opening and a lower channel that is of a narrower size than the opening; and
charging points located on a same surface as the first receptacle; and
a battery case that houses at least a battery and which comprises a connecting surface, the battery case comprising:
a first male member on the connecting surface that engages with the main body's first receptacle, wherein the first male member inserts into the first receptacle's opening and advances downward through the first receptacle's channel;
charging points on the connecting surface that engage with the main body's charging points when the first male member advances downward into the channel; and
an input surface on a side opposite the connecting surface of the battery case, wherein the input surface receives user inputs that are transmitted through at least a portion of the battery case to the main body.

2. The earbud of claim 1, wherein the first male member includes a neck and a head that attaches to an end of the neck, and the neck extends into the first receptacle's channel.

3. The earbud of claim 2, wherein the main body includes a second receptacle having an opening and a channel and a second male member having a head and a neck, wherein:
the opening on the first receptacle and the head of the first male member correspond in size and shape,
the opening on the second receptacle and the head of the second male member correspond in size and shape, and
the size and shape of the first receptacle and first male member are different from the size and shape of the second receptacle and second male member.

4. The earbud of claim 3, wherein the main body's charging points and the battery case's charging points are off-centered when the heads for the first and second male members are aligned with and inserted into the respective openings for the first and second receptacles.

5. The earbud of claim 4, wherein the main body and battery case's charging points are fully aligned when the male members are secured down and fastened inside the receptacle's channels.

6. The earbud of claim 5, wherein the first and second receptacles are adapted with one or more friction fit or tab and notch mechanisms to secure the main body's respective first and second male members.

7. The earbud of claim 6, wherein an inside of the main body's first and second receptacles are friction fit channels to secure the heads of the male members in place.

8. The earbud of claim 1, wherein the main body receives user inputs at the input surface of the battery case and executes actions responsive to the received input, in which the main body of the earbud is equipped with memory and a processor to execute the actions.

9. The earbud of claim 8, wherein the executed actions responsive to the received input include any one or more of play, pause, stop, fast forward, rewind, adjust volume, or answer a phone call.

10. The earbud of claim 9, further comprising a sensor wire inside the battery case, which transmits detected input at the input surface to a metallic sensor that aligns with a corresponding sensor on the main body, when the battery case is attached to the main body.

11. An earbud adapted for use with interchangeable batteries, comprising:
one or more processors;
a sensor operatively coupled to the one or more processors;
memory storing instructions that are executable by the one or more processors responsive to the one or more processors receiving input from the sensor; and
a main body having:
a first receptacle having an upper opening and a lower channel that is of a narrower size than the opening; and
charging points located on a same surface as the first receptacle; and
a battery case that houses at least the battery and which comprises a connecting surface, the battery case comprising:
a first male member on the connecting surface that engages with the main body's first receptacle, wherein the first male member inserts into the first receptacle's opening and advances downward through the first receptacle's channel;
charging points on the connecting surface that engage with the main body's charging points when the first male member advances downward into the channel; and
an input surface on a side opposite the connecting surface of the battery case, wherein the input surface receives user inputs that are transmitted through at least a portion of the battery case to the main body.

12. The earbud of claim 11, wherein the first male member includes a neck and a head that attaches to an end of the neck, and the neck extends into the first receptacle's channel.

13. The earbud of claim 12, wherein the main body includes a second receptacle having an opening and a channel and a second male member having a head and a neck, wherein:
the opening on the first receptacle and the head of the first male member correspond in size and shape,
the opening on the second receptacle and the head of the second male member correspond in size and shape, and
the size and shape of the first receptacle and first male member are different from the size and shape of the second receptacle and second male member.

14. The earbud of claim 13, wherein the main body's charging points and the battery case's charging points are off-centered when the heads for the first and second male members are aligned with and inserted into the respective openings for the first and second receptacles.

15. The earbud of claim 14, wherein the main body and battery case's charging points are fully aligned when the male members are secured down and fastened inside the receptacle's channels.

16. The earbud of claim 15, wherein the first and second receptacles are adapted with one or more friction fit or tab and notch mechanisms to secure the main body's respective first and second male members.

17. The earbud of claim 16, wherein an inside of the main body's first and second receptacles are friction fit channels to secure the heads of the male members in place.

18. The earbud of claim 11, further comprising a sensor wire inside the battery case, which transmits detected input at the input surface to a metallic contact point that aligns with a corresponding sensor on the main body; when the battery case is attached to the main body.

* * * * *